United States Patent
Yu et al.

(10) Patent No.: US 12,283,669 B2
(45) Date of Patent: Apr. 22, 2025

(54) TEMPERATURE MEASURING APPARATUS, BATTERY APPARATUS INCLUDING THE SAME AND TEMPERATURE MEASURING METHOD

(71) Applicant: LG Energy Solution, Ltd., Seoul (KR)

(72) Inventors: Donghyeon Yu, Daejeon (KR); Seunghyun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 893 days.

(21) Appl. No.: 17/422,810

(22) PCT Filed: Jul. 29, 2020

(86) PCT No.: PCT/KR2020/010011
§ 371 (c)(1),
(2) Date: Jul. 14, 2021

(87) PCT Pub. No.: WO2021/085808
PCT Pub. Date: May 6, 2021

(65) Prior Publication Data
US 2022/0158264 A1  May 19, 2022

(30) Foreign Application Priority Data
Oct. 29, 2019  (KR) .......................... 10-2019-0135681

(51) Int. Cl.
*H01M 10/48* (2006.01)
*G01K 7/22* (2006.01)
*H01M 10/42* (2006.01)

(52) U.S. Cl.
CPC ............ *H01M 10/486* (2013.01); *G01K 7/22* (2013.01); *H01M 10/425* (2013.01); *H01M 2010/4271* (2013.01); *H01M 10/482* (2013.01)

(58) Field of Classification Search
CPC ............ H01M 10/486; H01M 10/425; H01M 10/482; H01M 2010/4271; G01K 7/22; G01K 15/007; G01K 7/24; Y02E 60/10
See application file for complete search history.

(56) References Cited

U.S. PATENT DOCUMENTS 5,582,928 A * 12/1996 Farley ................. H02J 7/00047
429/61
5,907,238 A *  5/1999 Owerko ................ H02J 9/005
320/136

(Continued)

FOREIGN PATENT DOCUMENTS

| CN | 1856838 A | 11/2006 |
| EP | 3624254 A1 | 3/2020 |

(Continued)

OTHER PUBLICATIONS

International Search Report for Application No. PCT/KR2020/010011 mailed Nov. 2, 2020, pp. 1-3.

(Continued)

*Primary Examiner* — Peter G Leigh
*Assistant Examiner* — Nader J Alhawamdeh
(74) *Attorney, Agent, or Firm* — Lerner David LLP (57) ABSTRACT

A temperature measuring apparatus for measuring a temperature of a battery pack is provided. A first resistor is connected between a first power supply and a first node, and a second resistor is connected between a second node and a second power supply. A temperature-variable resistive element whose resistance is varied depending on a temperature is connected to between the first node and the second node. A processor measures the temperature of the battery pack based on at least one of a first temperature measured based on a voltage of the first node and a second temperature measured based on a voltage of the second node.

12 Claims, 4 Drawing Sheets

(56) References Cited

U.S. PATENT DOCUMENTS

| | | | |
|---|---|---|---|
| 7,262,605 B2* | 8/2007 | Seo | H01M 10/486 374/E7.031 |
| 2005/0071116 A1* | 3/2005 | Kim | G11C 11/406 702/132 |
| 2005/0231169 A1 | 10/2005 | Seo et al. | |
| 2011/0080139 A1* | 4/2011 | Troxel | H01M 10/441 320/136 |
| 2011/0296218 A1* | 12/2011 | Kim | H02J 3/381 713/323 |
| 2014/0126608 A1 | 5/2014 | Ozaki et al. | |
| 2015/0035475 A1* | 2/2015 | Li | H02J 7/00309 320/107 |
| 2015/0211945 A1 | 7/2015 | Shimizu et al. | |
| 2016/0124046 A1 | 5/2016 | Kang et al. | |
| 2018/0045789 A1 | 2/2018 | Kawamoto et al. | |
| 2019/0006722 A1 | 1/2019 | Kim et al. | |
| 2019/0356143 A1 | 11/2019 | Lee et al. | |
| 2022/0158264 A1* | 5/2022 | Yu | G01K 7/22 |
| 2023/0025900 A1* | 1/2023 | Kahn | H02J 7/0014 |

FOREIGN PATENT DOCUMENTS

| | | |
|---|---|---|
| JP | H05109462 A | 4/1993 |
| JP | 2000193533 A | 7/2000 |
| JP | 2005009924 A | 1/2005 |
| JP | 2013050579 A | 3/2013 |
| JP | 2015138570 A | 7/2015 |
| JP | 2018017528 A | 2/2018 |
| JP | 2018049726 A | 3/2018 |
| KR | 820002166 B1 | 11/1982 |
| KR | 101074785 B1 | 10/2011 |
| KR | 20120138978 A | 12/2012 |
| KR | 20130053501 A | 5/2013 |
| KR | 20190001830 A | 1/2019 |
| KR | 20190011568 A | 2/2019 |
| KR | 20190042260 A | 4/2019 |

OTHER PUBLICATIONS

Extended European Search Report including Written Opinion for Application No. 20882671.9 dated Feb. 28, 2022, pp. 1-9.

* cited by examiner

TEMPERATURE MEASURING APPARATUS, BATTERY APPARATUS INCLUDING THE SAME AND TEMPERATURE MEASURING METHOD

CROSS-REFERENCE TO RELATED APPLICATION

The present application is a national phase entry under 35 U.S.C. § 371 of International Application No. PCT/KR2020/010011 filed Jul. 29, 2020, published in Korean, which claims priority from Korean Patent Application No. 10-2019-0135681 filed on Oct. 29, 2019, all of which are incorporated herein by reference.

The described technology relates to a temperature measuring apparatus and a battery apparatus including the same.

TECHNICAL FIELD

Background Art

An electric vehicle is a vehicle that obtains power by driving a motor mainly using a battery as a power source. The electric vehicles are being actively researched because they are alternatives that can solve pollution and energy problems of internal combustion vehicles. In addition, rechargeable batteries are used in various electronic devices other than the electric vehicles.

A battery management system is used to manage the battery. The battery management system monitors information such as a voltage, a state of charge, and a temperature of a battery cell included in the battery. The battery management system uses a semiconductor device called a thermistor to monitor the temperature of the battery cell. The thermistor is a type of resistance whose resistance is dependent on temperature. There are a thermistor having a negative coefficient whose resistance decreases as the temperature rises and a thermistor having a positive coefficient whose resistance increases as the temperature rises.

As a temperature monitoring method using a thermistor, there is a method of connecting one end of the thermistor to a ground end and the other end of the thermistor to a power supply through a pull-up resistor, and monitoring a voltage between the two ends of the thermistor. In this case, if the resistance of the pull-up resistor changes due to external damage (this is referred to as a "parameter change failure"), the battery management system may incorrectly measure the temperature. Particularly, when the pull-up resistor is open-circuited or short-circuited, the resistance largely changes. In this case, since the battery management system detects approximately 0V or a voltage corresponding to the power supply, abnormality of the pull-up resistor can be diagnosed. However, when the change of the resistance in the pull-up resistance is small, the abnormality of the pull-up resistor cannot be diagnosed. Therefore, functional safety can be adversely affected by the temperature incorrectly measured due to the parameter change failure.

SUMMARY

Technical Problem

An embodiment may provide a temperature measuring apparatus and a battery apparatus including the same, capable of accurately measuring a temperature or diagnosing a parameter change failure.

Technical Solution

According to one embodiment, a temperature measuring apparatus for measuring a temperature of a battery pack is provided. The temperature measuring apparatus includes a first resistor, a second resistor, a temperature-variable resistive element, and a processor. The first resistor is connected between a first power source and a first node, and the second resistor is connected between a second node and the second power source. The temperature-variable resistive element is connected to between the first node and the second node, and a resistance of the temperature-variable resistive element varies depending on a temperature of the temperature-variable resistive element. The processor measures a first temperature based on a voltage of the first node, a second temperature based on a voltage of the second node, and a temperature of the battery pack based on at least one of the first temperature or the second temperature.

The processor may invalidate the measured temperature of the battery pack in response to the first temperature being different from the second temperature.

The temperature-variable resistive element may be a thermistor.

The processor may be configured to convert the voltage of the first node into the first temperature and the voltage of the second node into the second temperature according to a predetermined mapping between voltages and temperatures.

The temperature measuring apparatus may further include an analog-digital converter that is configure to convert the voltage of the first node into a first digital value, and the voltage of the second node into a second digital value, the processor is configured to receive the first and second digital values.

The second power supply may be a ground terminal.

According to another embodiment, a battery apparatus including a battery pack, a temperature sensing circuit, and a processor is provided. The temperature sensing circuit includes a first resistor connected between a first power supply and a first node, a second resistor connected between a second node and a second power supply, and a temperature-variable resistive element connected to between the first node and the second node, a resistance of the temperature-variable resistive element varying depending on a temperature of the temperature-variable resistive element. The processor may be configured to measure a first temperature based on a voltage of the first node, a second temperature based on a voltage of the second node, and a temperature of the battery pack based on at least one of the first temperature or the second temperature.

According to yet another embodiment, a method of measuring a temperature of a battery pack using a temperature-variable resistive element is provided. The method includes measuring a first voltage into which a voltage of a predetermined power source is divided between a pull-up resistor and the temperature-variable resistive element, measuring a second voltage into which the voltage of the predetermined power source is divided between the temperature-variable resistive element and a pull-down resistor, measuring a first temperature based on the first voltage, measuring a second temperature based on the second voltage, and measuring a temperature of the battery pack based on at least one of the first temperature or the second temperature.

Advantageous Effects

According to an embodiment, since occurrence of a parameter change failure can be diagnosed, it is possible to prevent functional safety from being adversely affected due to a temperature incorrectly measured by the parameter change failure.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is "connected" to another element, it should be understood that the element may be directly connected to the other element or connected to the other element through a third element. On the other hand, when it is described that an element is "directly connected" to another element, it should be understood that the element is connected to the other element through no third element.

As used herein, a singular form may be intended to include a plural form as well, unless the explicit expression such as "one" or "single" is used.

Figure 1:
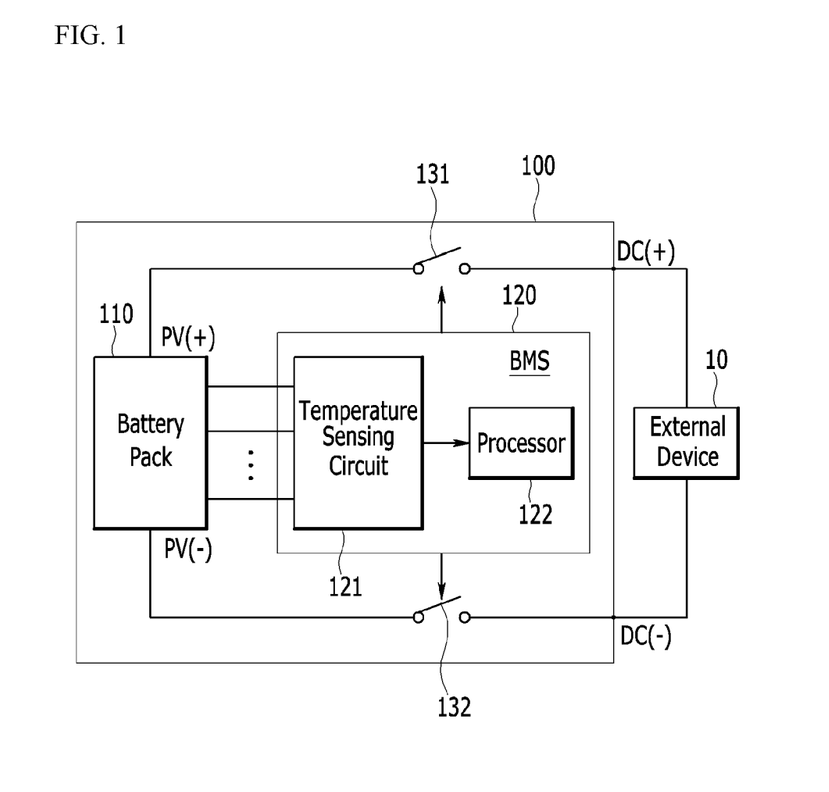
FIG. 1 is a drawing showing a battery apparatus according to an embodiment.

FIG. 1 is a drawing showing a battery apparatus according to an embodiment.

Referring to FIG. 1, a battery apparatus 100 has a structure that can be electrically connected to an external device through a positive link terminal DC(+) and a negative link terminal DC(−). When the external device is a load, the battery apparatus 100 is discharged by operating as a power supply that supplies power to the load. When the external device is a charger, the battery apparatus 100 is charged by receiving external power through the charger. The external device operating as the load may be, for example, an electronic device, a means of movement, or an energy storage system (ESS). The means of movement may be, for example, an electric vehicle, a hybrid vehicle, or a smart mobility.

The battery apparatus 100 includes a battery pack 110, a battery management system (BMS) 120, and switches 131 and 132.

The battery pack 110 includes a plurality of battery cells (not shown). In some embodiments, the battery cell may be a rechargeable battery. In an embodiment, the battery pack 110 may include a battery module in which a predetermined number of battery cells are connected in series. In another embodiment, a predetermined number of battery modules may be connected in series or in parallel in the battery pack 110 to supply desired power.

The plurality of battery cells of the battery pack 110 are electrically connected to the battery management system 120 through wires. The battery management system 120 may collect and analyze various information related to the battery cells including information on the battery cells to control charging and discharging of the battery cells, cell balancing, a protection operation, and operations of the switches 131 and 132.

The battery management system 120 includes a temperature sensing circuit 121 and a processor 122. The temperature sensing circuit 121 detects information corresponding to a temperature of the battery cells, and the processor 122 measures the temperature of the battery cells based on the information detected by the temperature sensing circuit 121. In some embodiments, the temperature sensing circuit 121 may include a temperature-variable resistive element formed at a position corresponding to a predetermined battery cell among the battery cells. In one embodiment, a plurality of temperature sensing circuits 121 that are formed in a plurality of positions respectively may be provided. In one embodiment, the temperature-variable resistive element may be a thermistor.

The switches 131 and 132 are connected between the battery pack 110 and the external device 10 to control the electrical connection between the battery pack 110 and the external device 10. For example, the switch 131 may be connected between a positive output terminal PV(+) to which a positive voltage of the battery pack 110 is output and a positive link terminal DC(+) connected to the external device 10, and the switch 132 may be connected between a negative output terminal PV(−) to which a negative voltage of the battery pack 110 is output and a negative link terminal DC(−) connected to the external device 10. The switches 131 and 132 are operated by a signal supplied from the processor 122 of the battery management system 120.

Next, a temperature measuring apparatus of a battery management system according to various embodiments is described with reference to FIG. 2 to FIG. 4.

First, a general temperature measuring apparatus of a battery management system is described with reference to FIG. 2.

Figure 2:
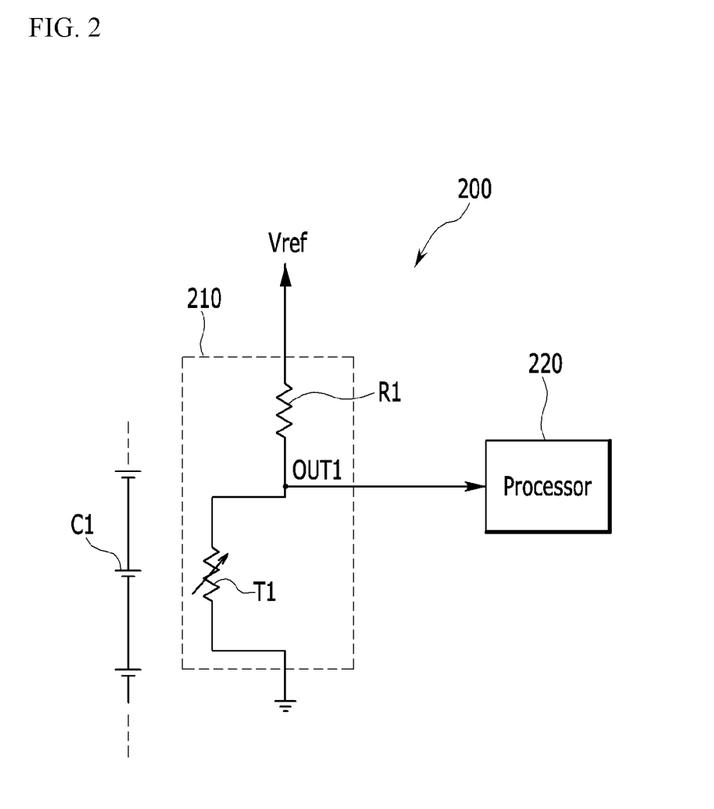
FIG. 2 is a drawing showing a temperature measuring apparatus of a battery management system.

FIG. 2 is a drawing showing a temperature measuring apparatus of a battery management system.

Referring to FIG. 2, a temperature measuring apparatus 200 includes a temperature sensing circuit 210 and a processor 220.

The temperature sensing circuit 210 includes a pull-up resistor R1 and a temperature-variable resistive element T1 connected in series between a power supply Vref supplying a power supply voltage and a ground terminal. Specifically, a first terminal of the pull-up resistor R1 is connected to the power supply Vref supplying the power supply voltage, and a second terminal of the pull-up resistor R1 is connected to an output node OUT1 of the temperature sensing circuit 210. A first terminal of the temperature-variable resistive element T1 is connected to the output node OUT1, and a second terminal of the temperature-variable resistive element T1 is connected to the ground terminal. The output node OUT1 of the temperature sensing circuit 210 is connected to the processor 220 through a wire.

In some embodiments, the temperature-variable resistive element T1 may be a thermistor. In one embodiment, the temperature-variable resistive element T1 may be a negative temperature coefficient (NTC) thermistor.

In some embodiments, the temperature-variable resistive element T1 may be formed at a position corresponding to a predetermined battery cell C1 among a plurality of battery cells.

Since a resistance of the temperature-variable resistive element T1 is determined according to a temperature of the battery cell, the temperature sensing circuit 210 senses the temperature of the battery cell, i.e., a battery pack, based on a voltage into which the power source voltage Vref is divided by the pull-up resistor R1 and the temperature-variable resistive element T1. The processor 220 receives the voltage into which the power source voltage Vref is divided by the pull-up resistor R1 and the temperature-variable resistive element T1 through the output node OUT1, and measures the temperature of the battery cell based on the divided voltage. In some embodiments, the processor 220 may include a table in which a relationship between the divided voltage and the temperature is mapped, and may convert the divided voltage into the temperature using the table.

In the temperature measuring apparatus 200 shown in FIG. 2, a parameter change failure, such as a change in the resistance of the pull-up resistor R1 due to an external damage, may occur. In this case, a voltage which is different from the voltage according to the temperature actually sensed in the battery cell due to the change in the resistance of the pull-up resistor R1 is output through the output node OUT1, and the processor 220 incorrectly measures the temperature. However, since the processor 220 normally receives the voltage from the temperature sensing circuit 210, there is a problem that the processor 220 cannot determine that the measured temperature is an incorrect temperature.

Figure 3:
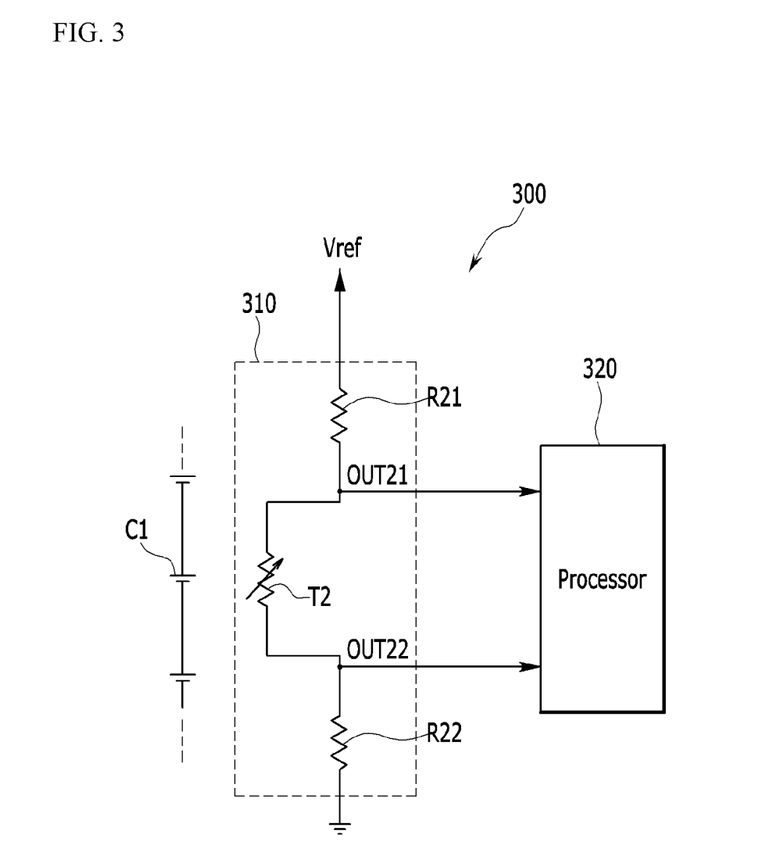
FIG. 3 is a drawing showing a temperature measuring apparatus of a battery management system according to an embodiment.

FIG. 3 is a drawing showing a temperature measuring apparatus of a battery management system according to an embodiment.

Referring to FIG. 3, a temperature measuring apparatus 300 includes a temperature sensing circuit 310 and a processor 320.

The temperature sensing circuit 310 includes a pull-up resistor R21, a temperature-variable resistive element T2, and a pull-down resistor R22 that are connected in series between a power supply Vref supplying a power supply voltage and a ground terminal. Specifically, the pull-up resistor R21 is connected between the power supply supplying the power supply voltage Vref and a first output node OUT21 of the temperature sensing circuit 310. The temperature-variable resistive element T2 is connected between the first output node OUT21 and a second output node OUT22 of the temperature sensing circuit 310. The pull-down resistor R22 is connected between the second output node OUT22 and the ground terminal. The first output node OUT21 and the second output node OUT22 are connected to the processor 320 through wires.

In some embodiments, a power supply having a lower voltage than the power supply voltage Vref may be used instead of the ground terminal.

In some embodiments, the temperature-variable resistive element T2 may be a thermistor. In one embodiment, the temperature-variable resistive element T2 may be an NTC thermistor.

In some embodiments, the temperature-variable resistive element T2 may be formed at a position corresponding to a predetermined battery cell C1 among a plurality of battery cells.

In some embodiments, the processor 320 may be a micro controller unit (MCU).

Since a resistance of the temperature-variable resistive element T2 is determined based on a temperature of the battery cell, the temperature sensing circuit 210 senses the temperature of the battery cell, i.e., a battery pack (110 of FIG. 1) based on a voltage into which the power supply voltage Vref is divided by the pull-up resistor R21, the temperature-variable resistive element T2, and the pull-down resistor R22. A voltage V1 of the output node OUT21 is a voltage between the pull-up resistor R21 and the temperature-variable resistive element T2. Specifically, the voltage V1 is a value obtained by multiplying a reference voltage Vref divided by a resistance of the pull-up resistor R21, the temperature-variable resistive element T2 and the pull-down resistor R22 by a resistance of the temperature-variable resistive element T2 and the pull-down resistor R22, as in Equation 1. A voltage of the output node OUT22 is a voltage between the temperature-variable resistive element T2 and the pull-down resistor R22. Specifically, the voltage is a value obtained by multiplying the reference voltage Vref divided by the resistance of the pull-up resistor R21, the temperature-variable resistive element T2 and the pull-down resistor R22 by a resistance of the pull-down resistor R22, as in Equation 2.

$$V1 = \frac{Rt + R22}{R21 + Rt + R22} Vref \qquad \text{Equation 1}$$

$$V2 = \frac{R22}{R21 + Rt + R22} Vref \qquad \text{Equation 2}$$

In Equations 1 and 2, Rt is a resistance of the temperature-variable resistive element T2.

The processor 320 receives the divided voltage V1 through the output node OUT21, and measures the temperature of the battery cell based on the divided voltage V1. Further, the processor 320 receives the divided voltage V2 through the output node OUT22, and measures the temperature of the battery cell based on the divided voltage V2. In this case, the processor 320 may be set such that a temperature measured based on the voltage V1 is equal to a temperature measured based on the voltage V2 when the pull-up resistor R21 and the pull-down resistor R22 are normal. In some embodiments, the processor 320 may measure the temperature of the battery cell as a temperature based on a voltage of one of the two voltages V1 and V2.

In some embodiments, the processor 220 may include a table in which a relationship between the voltage V1 and the temperature is mapped, and a table in which a relationship between the voltage V2 and the temperature is mapped, and convert the divided voltages V1 and V2 into the temperatures using the tables.

In this case, when the resistance of the pull-up resistor R21 or the pull-down resistor R22 is changed, the magnitudes of voltages V1 and V2 are changed. Accordingly, the temperature calculated based on the voltage V1 may be different from the temperature calculated based on the voltage V2 by the processor 320. For example, in an environment where the temperature is measured as 25 degrees unless the resistance of the pull-up resistor R21 or the pull-down resistor R22 has been changed, the temperature based on the voltage V1 may be measured as 28 degrees and the temperature based on the voltage V2 may be measured as 22 degrees. Then, because the temperatures based on the two voltages V1 and V2 are different from each other, the processor 320 may determine that the measured temperature is invalid and diagnose that the change in the resistance of the pull-up resistor R21 or the pull-down resistor R22 (i.e., a parameter change failure) has occurred.

As such, since the occurrence of the parameter change failure can be diagnosed, it is possible to prevent functional safety from being adversely affected due to the temperature incorrectly measured by the parameter change failure.

Figure 4:
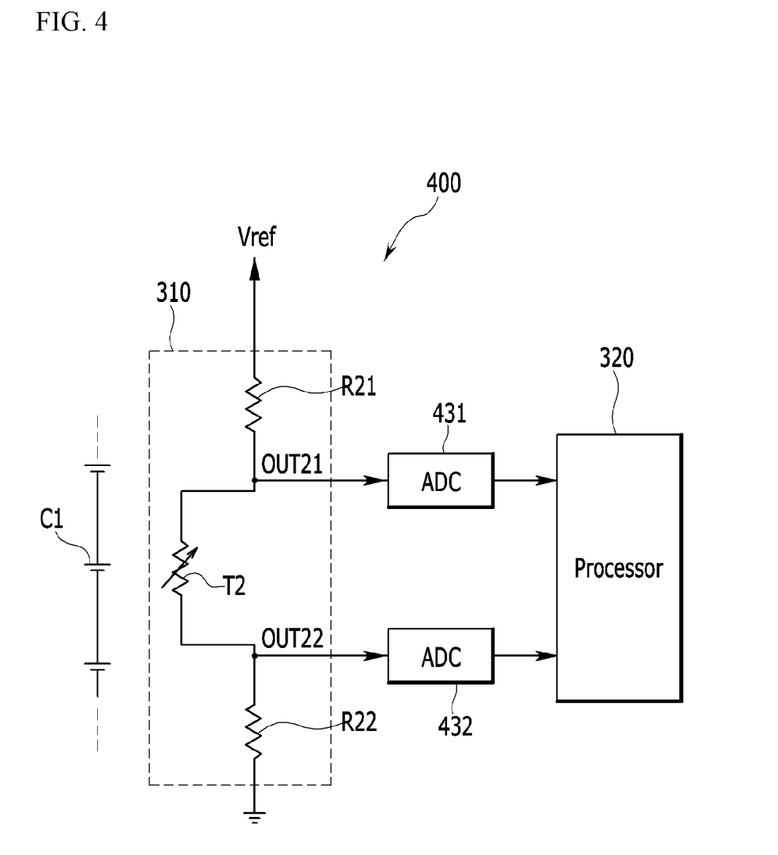
FIG. 4 is a drawing showing a temperature measuring apparatus of a battery management system according to another embodiment.

FIG. 4 is a drawing showing a temperature measuring apparatus of a battery management system according to another embodiment.

Referring to FIG. 4, a temperature measuring apparatus 400 further includes analog-digital converters (ADCs) 431 and 432.

An input terminal of the ADC 431 is connected to a first output node OUT21 of a temperature sensing circuit 310, and an output terminal of the ADC 431 is connected to a processor 320. The ADC 431 converts a voltage V1 of the first output node OUT21 into a digital value and transfers it to the processor 320.

An input terminal of the ADC 432 is connected to a second output node OUT22 of the temperature sensing circuit 310, and an output terminal of the ADC 432 is connected to the processor 320. The ADC 432 converts a voltage V2 of the second output node OUT22 to a digital value and transfers it to the processor 320.

Accordingly, the processor 320 can receive a digital signal as an input and process the digital signal.

In some embodiments, a method of measuring a temperature of a battery pack may be provided. In the method of measuring the temperature, a battery apparatus may measure a first voltage (e.g., V1) into which a voltage of a predetermined power source (e.g., Vref of FIG. 3) is divided between a pull-up resistor (e.g., R21 of FIG. 3) and a temperature-variable resistive element (e.g., T2 of FIG. 3), and measure a second voltage (e.g., V2) into which the voltage of the predetermined power source Vref is divided between the temperature-variable resistive element T2 and a pull-down resistor (e.g., R22 of FIG. 3). The battery apparatus may measure a first temperature based on the first voltage, measure a second temperature based on the second voltage, and then measure a temperature of the battery pack based on at least one temperature of the first temperature and the second temperature.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A temperature measuring apparatus for measuring a temperature of a battery pack, comprising:
 a first resistor connected between a first power supply and a first node;
 a second resistor connected between a second node and a second power supply;
 a temperature-variable resistive element connected between the first node and the second node, wherein a resistance of the temperature-variable resistive element varies depending on a temperature of the temperature-variable resistive element; and
 a processor configured to:
 receive a first voltage input from the first node;
 measure a first temperature based on the first voltage input;
 receive a second voltage input from the second node;
 measure a second temperature based on the second voltage input; and
 determine a temperature of the battery pack based on at least one of the first temperature or the second temperature.

2. The temperature measuring apparatus of claim 1, wherein the processor is configured to invalidate the determined temperature of the battery pack in response to the first temperature being different from the second temperature.

3. The temperature measuring apparatus of claim 1, wherein the temperature-variable resistive element is a thermistor.

4. The temperature measuring apparatus of claim 1, wherein the processor is configured to convert the first voltage input of the first node into the first temperature and the second voltage input of the second node into the second temperature according to a predetermined mapping between voltages and temperatures.

5. The temperature measuring apparatus of claim 1, further comprising an analog-digital converter that is configured to convert the first voltage input of the first node into a first digital value and the second voltage input of the second node into a second digital value,
 wherein the processor is configured to receive the first and second digital values.

6. The temperature measuring apparatus of claim 1, wherein the second power supply is a ground terminal.

7. A battery apparatus comprising:
 a battery pack;
 a temperature sensing circuit comprising:
 a first resistor connected between a first power supply and a first node;
 a second resistor connected between a second node and a second power supply; and
 a temperature-variable resistive element connected between the first node and the second node, wherein a resistance of the temperature-variable resistive element varies depending on a temperature of the temperature-variable resistive element; and
 a processor configured to:
 receive a first voltage input from the first node;
 measure a first temperature based on the first voltage input;
 receive a second voltage input from the second node;
 measure a second temperature based on the second voltage input; and
 determine a temperature of the battery pack based on at least one of the first temperature or the second temperature.

8. The battery apparatus of claim 7, wherein the processor is configured to invalidate the determined temperature in response to the first temperature being different from the second temperature.

9. The battery apparatus of claim 7, wherein the processor is configured to convert the first voltage input of the first node into the first temperature and the second voltage input of the second node into the second temperature according to a predetermined mapping between voltages and temperatures.

10. The battery apparatus of claim 7, wherein the second power supply is a ground terminal.

11. A method of measuring a temperature of a battery pack using a temperature-variable resistive element, the method comprising:
 receiving, by a processor, a first voltage input from a first node into which a voltage of a predetermined power source is divided between a pull-up resistor and the temperature-variable resistive element;

receiving, by the processor, a second voltage input from a second node into which the voltage of the predetermined power source is divided between the temperature-variable resistive element and a pull-down resistor;

measuring, by the processor, a first temperature based on the first voltage input;

measuring, by the processor, a second temperature based on the second voltage input; and determining, by the processor, a temperature of the battery pack based on at least one of the first temperature or the second temperature.

12. The method of claim 11, further comprising invalidating the temperature determination in response to the first temperature being different from the second temperature.

* * * * *